(12) United States Patent
Martinez

(10) Patent No.: US 10,788,365 B2
(45) Date of Patent: Sep. 29, 2020

(54) CIRCUIT FOR DETECTING LIGHT PULSES

(71) Applicant: SAFRAN ELECTRONICS & DEFENSE, Boulogne Billancourt (FR)

(72) Inventor: Alain Martinez, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 22 days.

(21) Appl. No.: 16/077,657

(22) PCT Filed: Feb. 16, 2017

(86) PCT No.: PCT/EP2017/053570
§ 371 (c)(1),
(2) Date: Aug. 13, 2018

(87) PCT Pub. No.: WO2017/140822
PCT Pub. Date: Aug. 24, 2017

(65) Prior Publication Data
US 2019/0049295 A1    Feb. 14, 2019

(30) Foreign Application Priority Data
Feb. 18, 2016   (FR) ...................... 16 00269

(51) Int. Cl.
| | | |
|---|---|---|
| G01J 1/46 | (2006.01) | |
| G01S 7/48 | (2006.01) | |
| G01J 1/42 | (2006.01) | |
| G01J 1/44 | (2006.01) | |
| G01S 7/487 | (2006.01) | |
| G01S 7/4861 | (2020.01) | |

(52) U.S. Cl.
CPC ............... *G01J 1/46* (2013.01); *G01J 1/4257* (2013.01); *G01S 7/4804* (2013.01); *G01J 2001/4238* (2013.01); *G01J 2001/446* (2013.01); *G01S 7/4861* (2013.01); *G01S 7/4873* (2013.01)

(58) Field of Classification Search
CPC ...... G01J 1/46; G01J 1/4257; G01J 2001/446; G01J 2001/4238; G01S 7/4804; G01S 7/4861; G01S 7/4873
USPC .............................................. 250/208.2, 205
See application file for complete search history.

(56) References Cited

U.S. PATENT DOCUMENTS

| | | | | |
|---|---|---|---|---|
| 4,320,289 A | * | 3/1982 | White ................... | G01J 1/4204 250/214 R |
| 4,481,675 A | * | 11/1984 | Ichikawa ................. | H03K 5/08 455/343.2 |
| 5,880,610 A | * | 3/1999 | Nishizono ............... | H03F 3/087 327/103 |
| 6,678,039 B2 | * | 1/2004 | Charbon ................. | G01S 7/487 342/135 |
| 10,222,258 B2 | * | 3/2019 | Lund ......................... | G01J 1/44 |
| 2010/0207028 A1 | | 8/2010 | Audier | |
| 2010/0226495 A1 | | 9/2010 | Kelly et al. | |
| 2012/0261553 A1 | | 10/2012 | Elkind et al. | |

* cited by examiner

*Primary Examiner* — Seung C Sohn
(74) *Attorney, Agent, or Firm* — Muncy, Geissler, Olds & Lowe, P.C.

(57) ABSTRACT

A light pulse detection circuit for connection to a photodiode, the detection circuit comprising an integration capacitor, discharge means, and comparator means adapted to compare an integration voltage across the terminals of the integration capacitor with a reference voltage threshold in order to produce a light pulse detection signal. The reference voltage threshold is a self-adaptive threshold depending on a level of light background noise. A detection device comprising a photodiode and such a detection circuit. A detection matrix comprising a plurality of such detection devices.

9 Claims, 1 Drawing Sheet

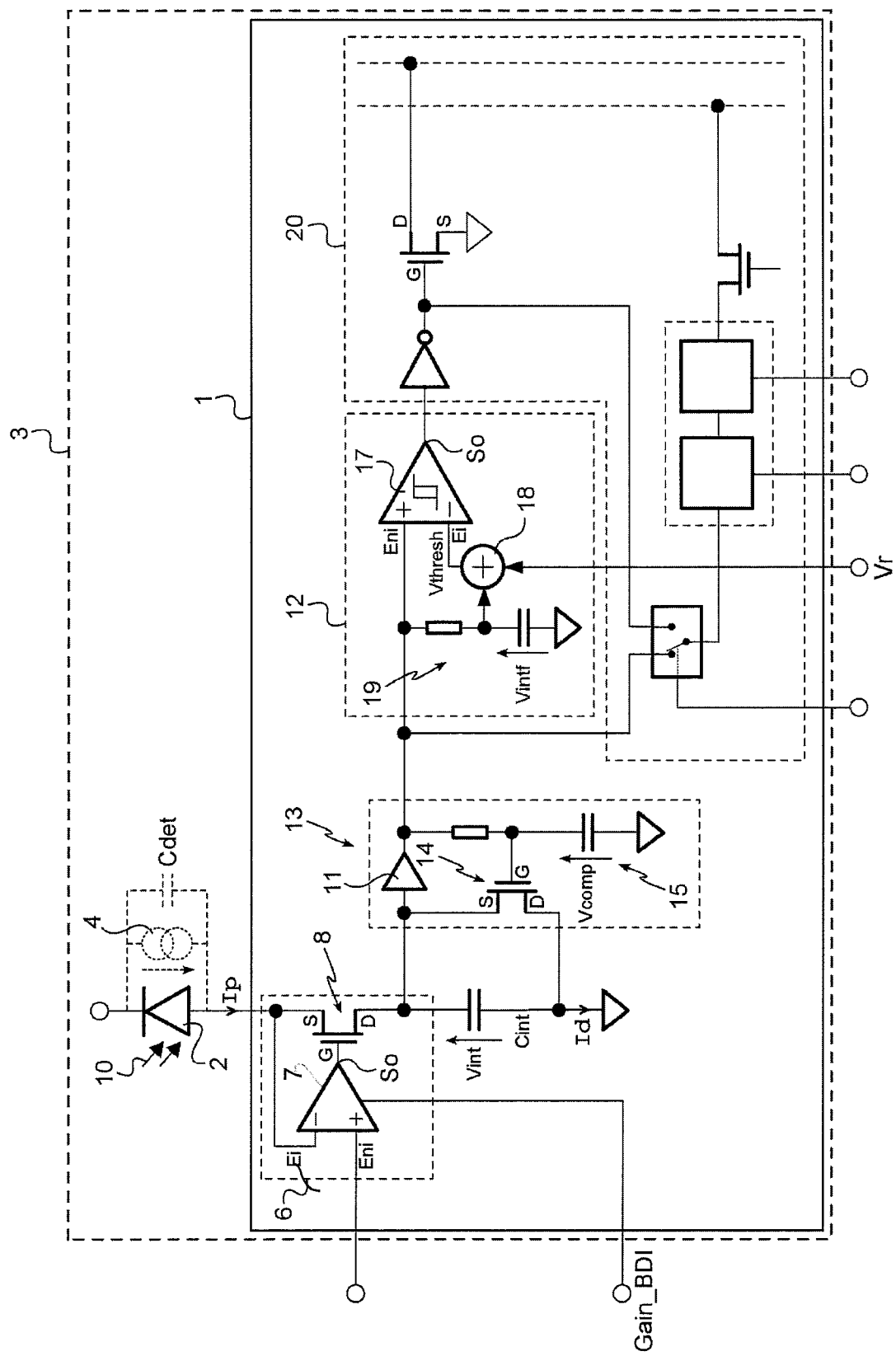

CIRCUIT FOR DETECTING LIGHT PULSES

The invention relates to the field of circuits for detecting light pulses, such as laser pulses.

BACKGROUND OF THE INVENTION

A laser detection matrix comprises a plurality of detection devices each comprising a photodiode and a detection circuit. The detection devices are arranged in rows and columns in order to form pixels of the laser detection matrix.

Each photodiode transforms an incident light ray into a photo-current. Each detection circuit conventionally includes an integration capacitor that integrates the photo-current for a predetermined integration period. The voltage across the terminals of the integration capacitor, which is proportional to the photo-current at the end of the integration period, is then used in order to detect the presence of light pulses in the incident light radiation.

Nevertheless, in addition to laser pulses, the incident light radiation that reaches each photodiode includes a certain level of light background noise, which depends on the light environment of the photodiode.

One of the main difficulties in detecting laser pulses consists in extracting the laser pulses effectively from the incident light radiation, i.e. in minimizing the rate of false alarms that result from detecting interfering signals included in the light background noise, but without that affecting the probability of detecting laser pulses.

OBJECT OF THE INVENTION

An object of the invention is to improve the detection of light pulses such as laser pulses by means of a detection circuit.

SUMMARY OF THE INVENTION

In order to achieve this object, there is provided a light pulse detection circuit for connection to a photodiode, the detection circuit comprising an integration capacitor adapted to integrate a photo-current produced by the photodiode, discharge means for discharging the integration capacitor, and comparator means adapted to compare an integration voltage across the terminals of the integration capacitor with a reference voltage threshold in order to produce a light pulse detection signal.

According to the invention, the reference voltage threshold is a self-adaptive threshold depending on a residual light background level.

When a constant reference voltage is used, the constant reference voltage needs to be high in order to avoid untimely detection of light pulses due to residual fluctuations in the residual light background level from a scene seen by the photodiode.

Nevertheless, the use of a high reference voltage tends to reduce the detection sensitivity of the detection circuit.

In contrast, by having a self-adaptive reference voltage threshold, the detection circuit of the invention adapts to the residual light background level of the pixel in question and reduces the rate of false alarms while conserving high detection sensitivity.

The invention also provides a detection device comprising a photodiode and such a detection circuit, and also provides a detection matrix comprising a plurality of such detection devices.

Other characteristics and advantages of the invention appear on reading the following description of a particular, non-limiting embodiment of the invention.

BRIEF DESCRIPTION OF THE DRAWING

Reference is made to the accompanying drawing which comprises a sole FIGURE constituting an electrical circuit diagram of the detection circuit of the invention.

DETAILED DESCRIPTION OF THE INVENTION

With reference to the sole FIGURE, the detection circuit 1 of the invention is connected to a photodiode 2. The detection circuit 1 and the photodiode 2 constitute a detection device 3 forming one pixel of a detection matrix that comprises a plurality of such detection devices arranged in rows and columns.

In this example, the photodiode 2 is a hybrid photodiode of the InGaAs type (i.e. a sensing element of the photodiode includes a layer of indium-gallium arsenide).

The photodiode 2 may be modeled by a current source 4 in parallel with a capacitor Cdet.

The detection circuit 1 is a circuit of the buffered direct injection (BDI) type.

The detection circuit 1 thus comprises a buffered direct injection block 6 that comprises an amplifier 7 and a first metal oxide on silicon field effect transistor (MOSFET) 8. An output So of the amplifier 7 is connected to the grid G of the first MOSFET 8. An inverting input Ei of the amplifier 7 is connected to a source S of the first MOSFET 8.

The buffered direct injection block 6 performs servo-control that serves to reduce the input impedance of the first MOSFET 8 and to improve control of the bias of the photodiode 2. Variations in the impedance of the capacitor Cdet are thus limited and current injection into an integration capacitor Cint is more effective.

The integration capacitor Cint is connected to a drain D of the first MOSFET 8. The integration capacitor Cint is adapted to integrate a photo-current Ip produced by the photodiode 2 and resulting from incident light radiation 10 reaching the photodiode 2.

The capacitance of the integration capacitor Cint is much smaller than the capacitance of the capacitor Cdet, and thus the current-voltage conversion gain of the detection circuit 1 is relatively large.

The current-voltage conversion gain may also be controlled collectively (i.e. for all of the detection devices in the detection matrix), so as to adapt continuously to the amplitude of the light pulses. The voltage Gain_BDI serves to control the current-voltage conversion gain.

Detecting light pulses, such as laser pulses, in the incident light radiation 10 consists in acting, at regular intervals, each equal to one predetermined integration period, to make use of an integration voltage Vint across the terminals of the integration capacitor Cint. The integration voltage Vint results from the photo-current Ip being integrated by the integration capacitor Cint. Because of the above-mentioned relatively large current-voltage conversion gain, the integration voltage Vint is high enough to make it possible to detect whether a current pulse representative of a light pulse is or is not present in the photo-current Ip.

The integration voltage Vint is used by comparing the integration voltage Vint across the terminals of the integration capacitor Cint with a reference voltage threshold Vthresh. The presence, in the photo-current Ip, of a current pulse representative of a light pulse during an integration period has the specific consequence of increasing the integration voltage Vint by a small amount, said small increase being detected by comparison with the reference voltage threshold Vthresh. Comparison is performed by comparator means 12 that are described below.

Nevertheless, it is necessary to discharge the integration capacitor Cint regularly so that an increase that is detected in the integration voltage Vint does indeed correspond to a current pulse that is representative of a light pulse, and not merely to charge accumulating in the integration capacitor Cint as a result of integrating the photo-current Ip over preceding integration periods.

For this purpose, the detection circuit 1 has discharge means 13 adapted to discharge the integration capacitance Cint continuously, i.e. the discharge means 13 operate permanently, and not only at the end of an integration period, for example.

The discharge means 13 include a second MOSFET 14 having a source S and a drain D that are connected to the terminals of the integration capacitor Cint, and having a grid G connected to a discharge lowpass filter 15. The source S is isolated by a voltage follower 11 (which is an isolating amplifier having high input impedance). The discharge lowpass filter 15 is connected to the integration capacitor Cint. In this example, the discharge lowpass filter 15 is a resistance capacitance (RC) filter.

The discharge lowpass filter 15 serves to produce a compensation voltage Vcomp. The compensation voltage Vcomp is a component of the voltage Vint that results from the presence of a background current in the photo-current Ip. The background current is generated by the photodiode 2 and comes from background illumination present in the incident light radiation 10. The compensation voltage Vcomp corresponds to the integration voltage Vint minus a component resulting from a current pulse as generated by a light pulse, which component is removed by the discharge lowpass filter 15.

Applying the compensation voltage Vcomp to the grid G of the second MOSFET 14 serves to generate a discharge current Id close to the background current that discharges the integration capacitance Cint continuously.

Highpass filtering is thus performed by the discharge lowpass filter 15 injecting back the discharge current Id.

The discharge lowpass filter 15 is also used to eliminate residual high frequency components from the voltage Vint.

The discharge means 13 thus serve to discharge the integration capacitor Cint automatically, while also subtracting in phase opposition the major portion of fluctuations in the background current from the scene.

The comparator means 12 then compare the integration voltage Vint, once cleared of a large portion of its background current fluctuations from the scene, with the reference voltage threshold Vthresh. The comparator means 12 comprise a comparator 17, a summing circuit 18, and a detection lowpass filter 19. In this example, the detection lowpass filter 19 is a second RC filter.

The detection lowpass filter 19 filters the signal Vint output by the voltage follower 11 and it serves to filter the integration voltage Vint in order to obtain a filtered integration voltage Vintf from which its components resulting from high frequency light pulses have been filtered out.

The filtered integration voltage Vintf, like the compensation voltage Vcomp, thus corresponds to the integration voltage Vint minus a component resulting from a current pulse generated by a light pulse. The reference voltage threshold Vthresh is a self-adapting threshold that results from the summing circuit 18 adding the background level Vint_F present in the incident light radiation 10 and a voltage threshold Vr that can be adjusted externally and collectively in order to obtain the final reference voltage threshold Vthresh.

The adjustable voltage threshold Vr is adjusted so that, for each pixel, the reference voltage threshold Vthresh is far enough above the background noise level to avoid generating false alarms, or else to adapt to stronger light pulses, for example.

The adjustable voltage threshold Vr is adjusted by a single adjustment voltage that applies to all of the pixels, either on one occasion by testing while setting up the detection matrix, or else continuously by using a component of the microcontroller or the field programmable gate array (FPGA) type.

The integration voltage Vint is applied to a non-inverting input Eni of the comparator 17. The reference voltage threshold Vthresh is applied to an inverting input Ei of the comparator 17. The comparator 17 compares the integration voltage Vint with the reference voltage threshold Vthresh.

When the integration threshold Vint is greater than the reference voltage threshold Vthresh, the comparator produces a digital signal on its output So, which signal is equal to "1". When the integration voltage Vint is less than or equal to the reference voltage threshold Vthresh, the comparator produces a digital signal on its output So, which signal is equal to "0".

The detection circuit 1 includes memory means 20 that store the successive values of the digital or analog signal. The rows and the columns of the detection matrix are multiplexed so as to produce digital signals equal to "0" or to "1" or analog signals for all of the pixels taken from the memory means 20 of each of the detection circuits 1 of the detection devices 3 of the detection matrix.

Advantageously, the detection circuit 1 is implemented at least in part on an application specific integration circuit (ASIC).

Naturally, the invention is not limited to the embodiment described but covers any variant coming within the ambit of the invention as defined by the claims.

The invention claimed is:

1. A light pulse detection circuit for connection to a photodiode, the detection circuit comprising:
   an integration capacitor adapted to integrate a photo-current produced by the photodiode, discharge means for discharging the integration capacitor, and
   comparator means adapted to compare an integration voltage (Vint) across the terminals of the integration capacitor with a reference voltage threshold in order to produce a light pulse detection signal,
   wherein the reference voltage threshold is a self-adaptive threshold depending on a level of light background noise; and
   wherein the comparator means include a comparator, a detection lowpass filter connected to the integration capacitor in order to filter the integration voltage so as to obtain a filtered integration voltage, a summing circuit for adding an adjustable voltage threshold to the filtered integration voltage so as to obtain the reference voltage threshold, the reference voltage threshold being applied to an inverting input of the comparator, and the integration voltage being applied to a non-inverting input of the comparator.

2. The detection circuit according to claim 1, wherein the detection lowpass filter is an RC filter adapted to eliminate high frequency light pulses from the signal Vint.

3. The detection circuit according to claim 1, wherein the discharge means are adapted to discharge the integration capacitor continuously.

4. The detection circuit according to claim 1, wherein the discharge means comprise a MOSFET having a source and a drain connected to the terminals of the integration capacitor and having a grid connected to a discharge lowpass filter connected to the integration capacitor.

5. The detection circuit according to claim 4, wherein the discharge lowpass filter is an RC filter for eliminating residual high frequency components from the signal Vint.

6. The detection circuit according to claim 1, the detection circuit being of the buffered direct injection type.

7. The detection circuit according to claim 6, presenting gain that can be controlled collectively by a voltage.

8. A detection device comprising a photodiode and a detection circuit according to claim 1.

9. A detection matrix comprising a plurality of detection devices according to claim 7 arranged in rows and columns.

* * * * *